United States Patent
Ulichney et al.

(10) Patent No.: US 9,454,721 B2
(45) Date of Patent: *Sep. 27, 2016

(54) DOCUMENT COPY WITH DATA-BEARING HALFTONE IMAGE

(75) Inventors: Robert Alan Ulichney, Stow, MA (US); Matthew D. Gaubatz, Seattle, WA (US); Stephen Pollard, Dursley (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/414,482

(22) PCT Filed: Jul. 30, 2012

(86) PCT No.: PCT/US2012/048839
§ 371 (c)(1),
(2), (4) Date: Jan. 13, 2015

(87) PCT Pub. No.: WO2014/021819
PCT Pub. Date: Feb. 6, 2014

(65) Prior Publication Data
US 2015/0220823 A1    Aug. 6, 2015

(51) Int. Cl.
G06K 15/02    (2006.01)
H04N 1/387    (2006.01)
H04N 1/00     (2006.01)
H04N 1/405    (2006.01)

(52) U.S. Cl.
CPC ...... *G06K 15/1881* (2013.01); *H04N 1/00278* (2013.01); *H04N 1/3876* (2013.01); *H04N 1/405* (2013.01); *H04N 2201/0081* (2013.01)

(58) Field of Classification Search
None
See application file for complete search history.

(56) References Cited

U.S. PATENT DOCUMENTS

| | | |
|---|---|---|
| 6,323,957 B1 | 11/2001 | Ball |
| 6,427,020 B1 | 7/2002 | Rhoads |
| 6,731,775 B1 * | 5/2004 | Ancin .......................... 382/100 |
| 7,865,042 B2 | 1/2011 | Cattrone et al. |
| 8,144,368 B2 | 3/2012 | Rodriguez et al. |
| 2002/0102007 A1 | 8/2002 | Wang |
| 2004/0075869 A1 * | 4/2004 | Hilton et al. ................ 358/3.28 |
| 2007/0036435 A1 | 2/2007 | Bhattacharjya |
| 2008/0180753 A1 | 7/2008 | Maeno |
| 2010/0091313 A1 * | 4/2010 | Kitada et al. ................ 358/1.13 |
| 2010/0128320 A1 | 5/2010 | Fan et al. |
| 2012/0229823 A1 * | 9/2012 | Sato ............................... 358/1.6 |
| 2014/0111831 A1 * | 4/2014 | Ulichney .............. G06F 21/608 358/3.06 |

FOREIGN PATENT DOCUMENTS

EP    0629972    12/1994

OTHER PUBLICATIONS

Bhattacharjya A.K. et al, "Data Embedding in Text for a Copier System", Epson Palo Alto Laboratory, Oct. 1999.

* cited by examiner

*Primary Examiner* — Thomas D Lee
(74) *Attorney, Agent, or Firm* — Dicke, Billig & Czaja, PLLC (PAT)

(57) ABSTRACT

Document copying systems and methods include initiating a copy job for copying a document having document content. A log of the copy job is generated, and the document is scanned to create a document content image. The log is encoded using an input image to produce a data-bearing halftone image which is merged with the document content image. The merged data-bearing halftone image and the document content image are printed to produce a copy of the document.

15 Claims, 6 Drawing Sheets

DOCUMENT COPY WITH DATA-BEARING HALFTONE IMAGE

BACKGROUND

Office copy machines, scanners, printers such as laser printers or inkjet, and all-in-one machines combining features of these devices enable the reproduction and copying of documents with relative ease. In environments where sensitive or confidential documents are handled it is often desirable to have the ability to determine if a document was copied, and trace who copied a document as well as when and where it was copied. Known solutions include overtly marking the document with bar codes, special inks, and the like.

DETAILED DESCRIPTION

In the following detailed description, reference is made to the accompanying drawings which form a part hereof, and in which is shown by way of illustration specific embodiments. It is to be understood that other embodiments may be utilized and structural or logical changes may be made without departing from the scope of the present invention. The following detailed description, therefore, is not to be taken in a limiting sense, and the scope of the present invention is defined by the appended claims. It is to be understood that features of the various embodiments described herein may be combined with each other, unless specifically noted otherwise.

It is often desirable to determine whether a sensitive document has been copied, and if the document was copied, trace who copied it and when and where it was copied. Some mechanisms for embedding data on a printed page are based on the use of various barcodes. These solutions, however, will impart a visual degradation to documents. Other solutions including special inks, such as magnetic or infrared, or electronic devices tend to be prohibitively costly. Moreover, known solutions may not provide adequate information about the secure document or the copies thereof.

In accordance with aspects of the present disclosure, example systems and methods include embedding copy job data onto copied pages of a document through the use of steganographic halftones. A copy job for copying a document having document content is initiated and a log of the copy job is generated. An image of the document's content is created, and the log is encoded using an input image to produce a data-bearing halftone image. The data-bearing halftone image is merged with the document content image and the merged data-bearing halftone image and the document content image are printed to produce a secure copy of the document.

Figure 1:
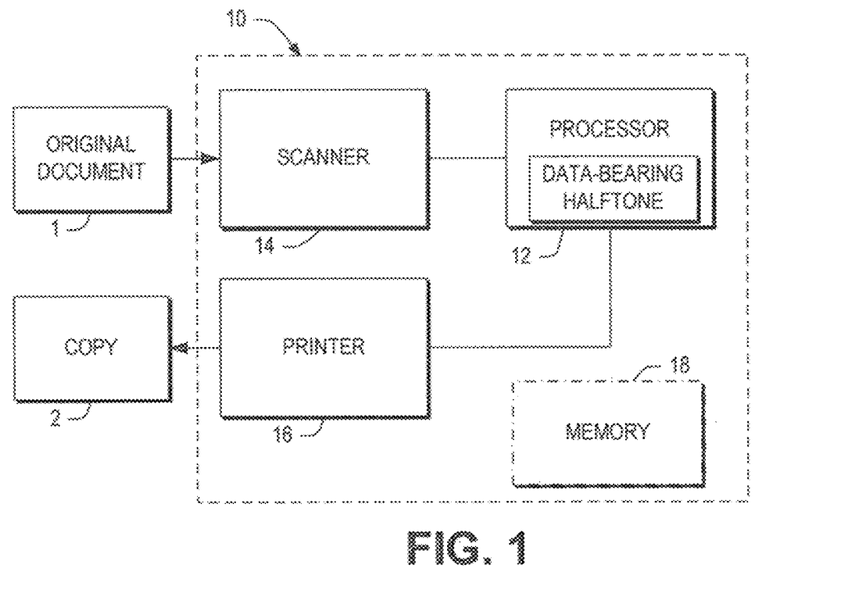
FIG. 1 is a block diagram illustrating an example of a document coping system in accordance with the present disclosure.

FIG. 1 is a block diagram conceptually illustrating an example of a document copying system 10 in accordance with aspects of the present disclosure. The example system 10 includes a processor 12, a scanner 14 and a printer 16. The processor 12 may be implemented by any suitable computing or data processing environment, including in digital electronic circuitry (e.g., an application-specific integrated circuit, such as a digital signal processor (DSP)) or in computer hardware, firmware, device driver, or software. In some examples, the functionalities of the modules are combined into a single data processing component and in other implementations the respective functionalities of each of one or more of the modules are performed by a respective set of multiple data processing components.

The system 10 may be implemented by a document copier or other "multifunction" or "all-in-one" device having capabilities for scanning, printing, copying, etc. In other instances, the system 10 is made up of discrete components, such as a stand-alone scanner 14 and printer 16. The processor 12 could be a processor of the scanner 14, the printer 16, or it could be the processor of a computer system such as a print server, or combinations thereof. In implementations using discrete components, the components could be connected by a wired or wireless network, an interface such as USB, or any other suitable connection.

The scanner 14 is configured to scan an original document 1, thus creating an image of the document content. The processor 12 is in communication with the scanner and is configured or programmed to generate a log of a copy job for copying the document 1. The processor is further configured to encode the log using an input image to produce a data-bearing halftone image, and merge the data-bearing halftone image with the document content image of the original document 1. The printer is in communication with the processor and is configured to print the merged data-bearing halftone image and the document content image to produce a copy 2 of the original document 1.

Examples of the system 10 further include a memory 18 accessible by the processor 12. The memory 18 could be a component of a copier implementing the system 10, the memory of the scanner 14 or printer 16, the memory of a computer containing the processor 12, or other memory accessible by the processor 18 via a network, or combinations thereof. The memory 18 is configured to store information associated with the copy job. Further, software code embodying disclosed methods may be stored in the memory 18 or another tangible storage medium that is accessible by the processor 12. Non-transient storage media suitable for tangibly embodying program instructions and image data include all forms of computer-readable memory, including, for example, RAM, semiconductor memory devices, such as EPROM, EEPROM, and flash memory devices, magnetic disks such as internal hard disks and removable hard disks, magneto-optical disks, DVD-ROM/RAM, and CD-ROM/RAM.

Figure 2:
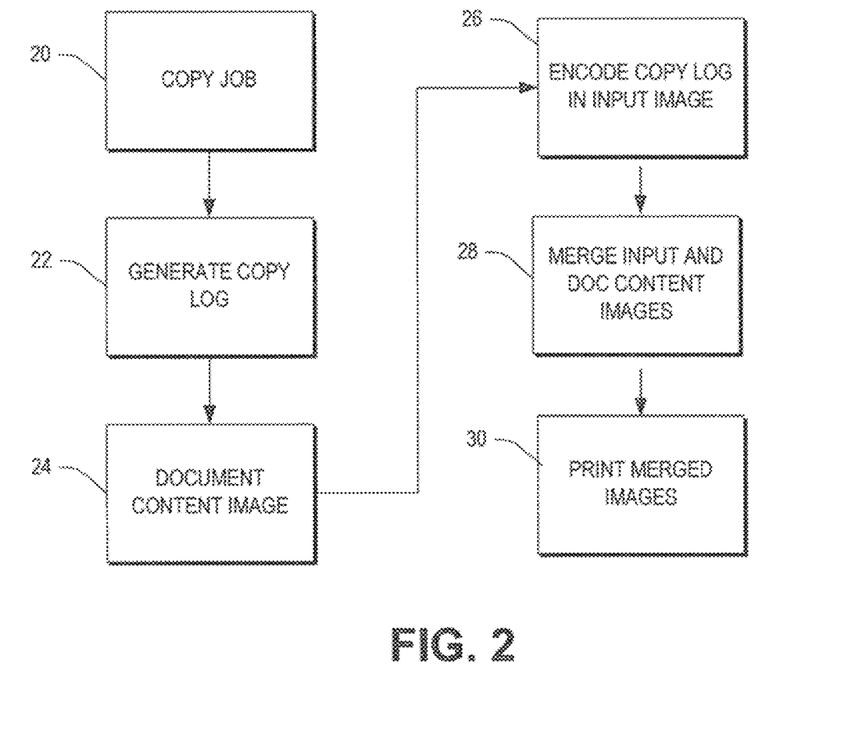
FIG. 2 is a block diagram illustrating an example of a document coping method in accordance with the present disclosure.

FIG. 2 is a block diagram generally illustrating an example method for producing a copy of a document that has data embedded in the produced copy. In block 20, a copy job is initiated for copying a document having document content. The system 10 generates a log of the copy job in block 22. In block 24, the document is scanned to create a document content image. The log is encoded using an input image such as a company logo to produce a data-bearing halftone image in block 26, and the data-bearing halftone image is merged with the document content image in block 28.

The log includes, for example, information associated with the copy job such as the name of the user who initiated the copy job, the time and date when the copy was produced, etc. This data may be provided in various formats, such as plain text, markup languages (e.g., XML, HTML, etc.) or other formats. The formatted copy log may be produced by a universal print driver, such as one manufactured by Hewlett-Packard, Inc. of Palo Alto, Calif.

In some implementations, the copy log information is encoded directly into the data-bearing halftone image. In other implementations, information associated with the log is stored in the memory 18 or other memory and the data-bearing halftone image includes an index to the memory location where the information is stored. In block 30, the merged data-bearing halftone image and the document content image are printed to produce a copy of the document.

Figure 3:
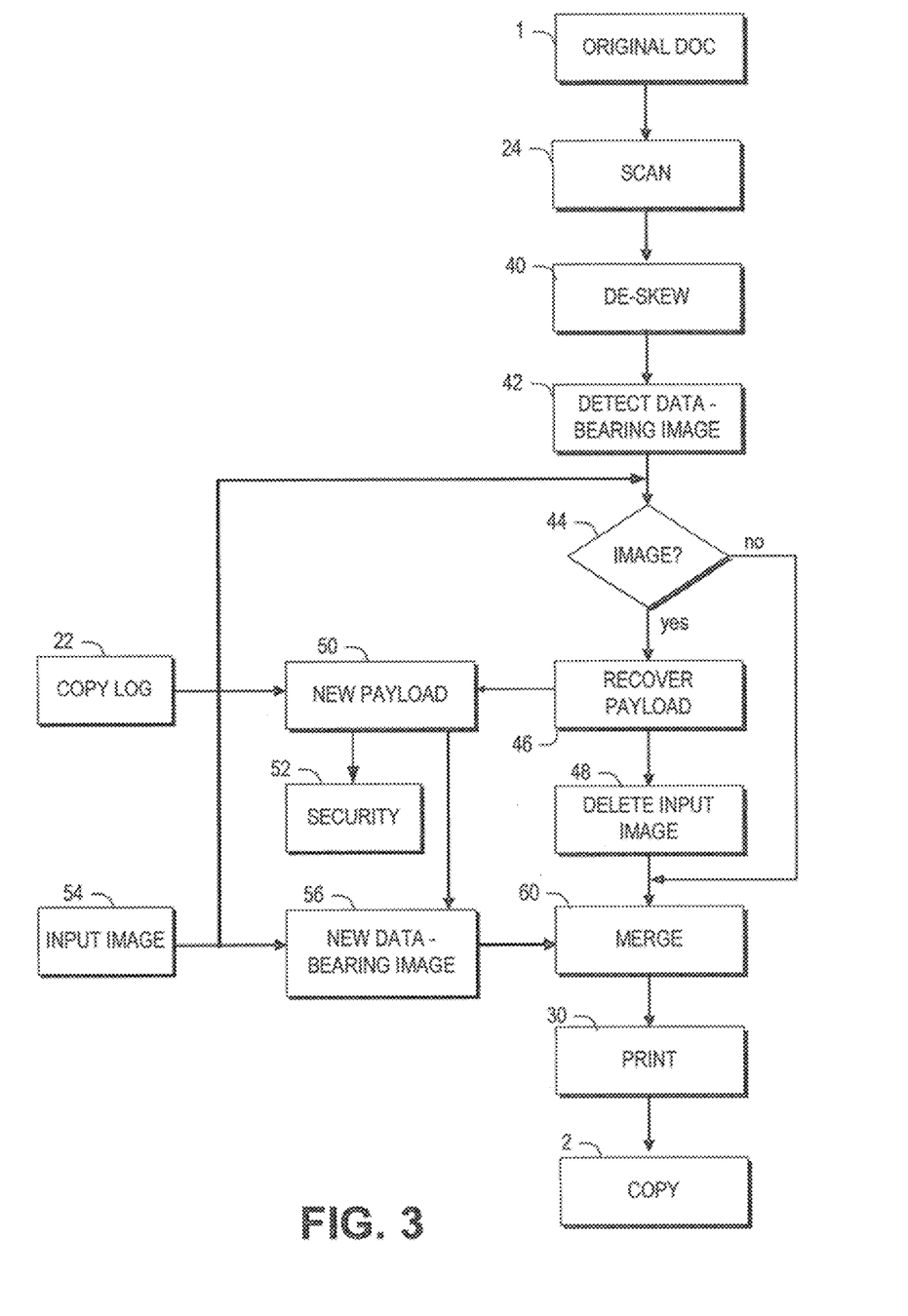
FIG. 3 is a block diagram illustrating another example of a document coping method in accordance with the present disclosure.

FIG. 3 is a block diagram illustrating an example method in accordance with further aspects of the present disclosure. As noted above, some or all of the elements of the process illustrated in FIG. 3 may be implemented as executable code instructions stored on a non-transitory tangible machine-readable media, such as the memory 18 and executed by the processor 12.

An original document 1 is digitized by a scanner such as the scanner 14 shown in FIG. 1 to create an image of the document's content in bock 24. In the example of FIG. 3, the skew of the document content image is detected and the scanned image is rotated to correct the skew, or "de-skew" the image in block 40. The resulting document content image is analyzed to determine if the document content image includes an original data-bearing halftone image 42. If it is determined in decision block 44 the document content image includes an original data-bearing halftone image, the orientation and position of the image may be recorded. In some instances, if the resolution is sufficient the data encoded into the original data-bearing image, or "payload," is recovered in block 46. The detected original data-bearing image is deleted from the output image in block 48 by replacing it with background pixels. The original data bearing image may be archived for auditing or other purposes.

A copy log 22 including, for example, the name of the user initiating the copy along with the current time and date is provided along with any other relevant data to generate a new payload in block 50. If the payload from the original document content image is recovered in block 46, it also can be provided as input to include in the new payload. Thus, the new payload 50 will include data about the current copy job as provided in block 22, and optionally about the original document 1 using the recovered payload 46. Further, the recovered payload information 46 can be used to initiate security actions in block 52. For example, based on policies regarding the original document 1 and the identification of the user requesting the copy, the system 10 may determine that the user requesting the copy is not authorized to copy the original document 1. Accordingly, the system 10 may prohibit production of the copy, and/or send a message to security officials.

If the copy is allowed to proceed, the new payload 50 is merged with the input image 54, which in some examples is a logo, to create a new data-bearing halftone image in block 56. In block 60, the new data-bearing halftone image is merged with the document content image. If the original document content contained a data-bearing halftone image as determined in decision block 44, the new data-bearing halftone image is located in the same position and orientation as in the original document 1. If a data-bearing halftone image was not detected in block 44, the new data-bearing halftone image is positioned in a specified position on the document. The merged image is printed in block 30 to create the secure copy 2.

In some implementations, the data-bearing images are produced using halftoning to produce a steganographic image (referred to as a "steganographic halftone" or a "data-bearing halftone image") by a process such as that described in U.S. Patent Application Publication No. 2011/0069328 entitled "System and Method for Creating a Data-Bearing Image," which is hereby incorporated by reference in its entirety. As used herein, the term "stegatone" also refers to a steganographic halftone. Unlike barcodes, a stegatone does not disturb the aesthetics of the document page composition, and yet holds a large number of bits.

Figure 4:
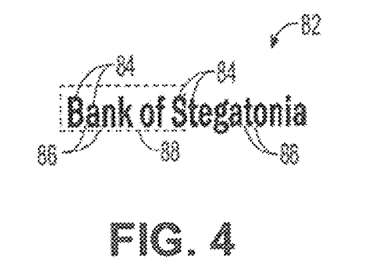
FIG. 4 is an example of a logo used as input image in accordance with the present disclosure.

As mentioned above, in some examples the input image used for the stegatone may be a logo or other similar image. The copy log or other information is sometimes referred to as the "payload," and the input image into which the payload is encoded is sometimes referred to as a "mule" image. FIG. 4 illustrates an example of such a mule image. As shown in FIG. 4, the mule image may be a logo 82 having a number of characters 84 separated by whitespace 86. As also described above, the logo 82 may be placed in the same position on each page of a printed document. As will be appreciated, the logo 82 may have a particular data carrying capacity for encoding data. For example, the logo 82 shown in FIG. 4 may be capable of carrying 448 bytes. If it is desired to encode an amount of data that goes beyond the carrying capability of the logo 82, such as may be the case when including copy log information for a current copy job as well as copy log information from previous copy logs as described in conjunction with FIG. 3, the desired data may be stored in the memory 18 shown in FIG. 1, or other memory, and an index to the memory location could be the encoded payload.

Figure 5:
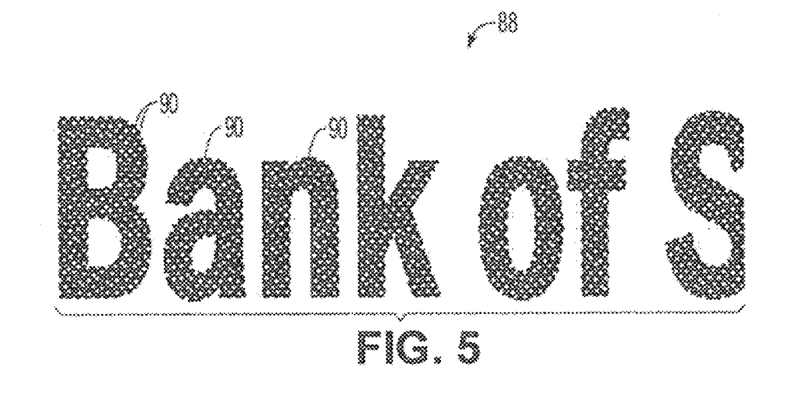
FIG. 5 is an enlargement of a portion of the example logo illustrated in FIG. 4 including data embedded using shifted halftone clusters.

FIG. 5 depicts an enlargement of a portion 88 of the logo 82 that illustrates an example of embedding data into the mule image as described herein. The enlarged portion 88 may include the halftoning of clustered dots 90 to encode the information. The representation of data can be seen as shifts of the halftone clusters 90 shown in FIG. 5. Additionally, the quality of the logo 82 or other stegatone may be improved by an edge refinement technique, such as that described in U.S. Patent Application Publication No. 2012/0086984 entitled "Edge Refinement System," hereby incorporated by reference.

Figure 6:
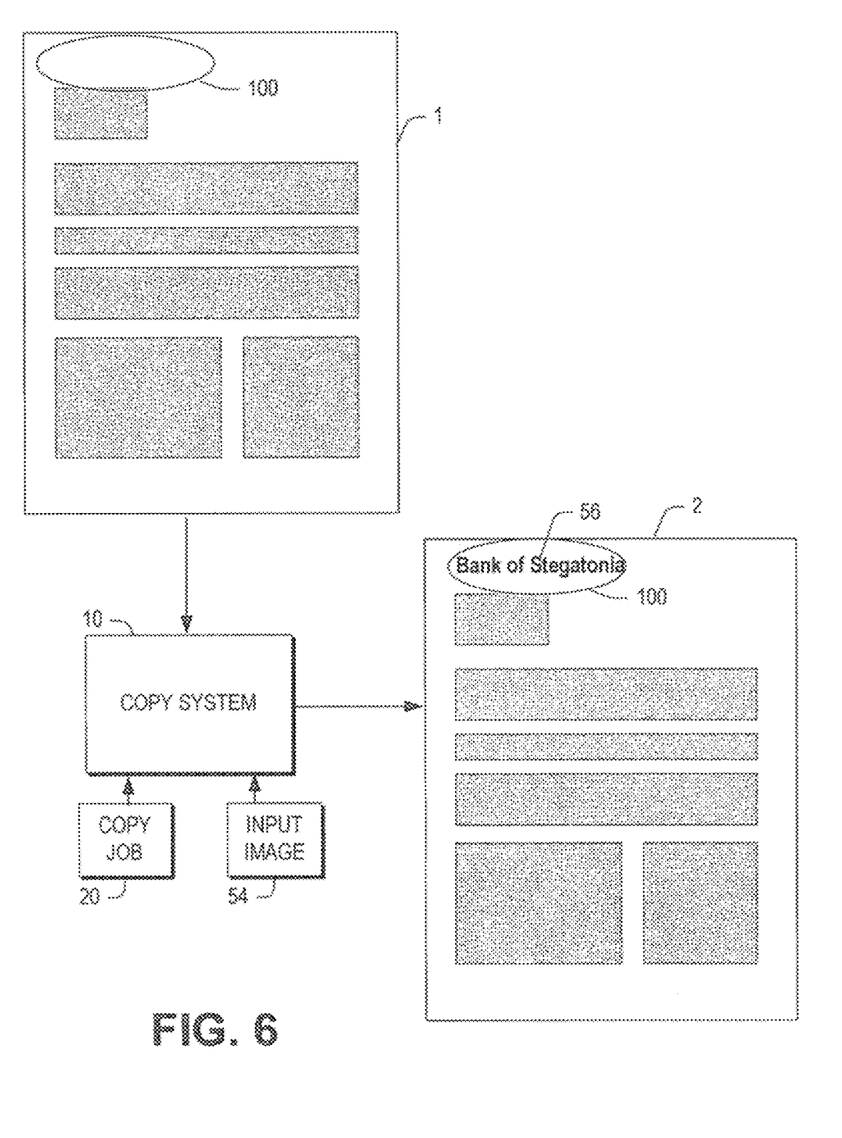
FIG. 6 is a block diagram illustrating an example of a secure document copying process.

FIG. 6 illustrates an example of a secure copying process when the original document 1 does not contain the data-bearing halftone image logo as shown in FIG. 4. As is evident in the original document 1 illustrated in FIG. 6, there is no logo in a logo location 100. Thus, referring back to FIG. 3, no data-bearing image 42 would be detected in block 44. The system 100 receives copy job information 20 for creating a copy log 22 along with the input, or mule image 54. The new payload 50, consisting of the copy log 22 merged with the input image 54, is merged with the document content image. The resulting new logo 56 is then situated in the logo location 100 of the produced copy 2.

Figure 7:
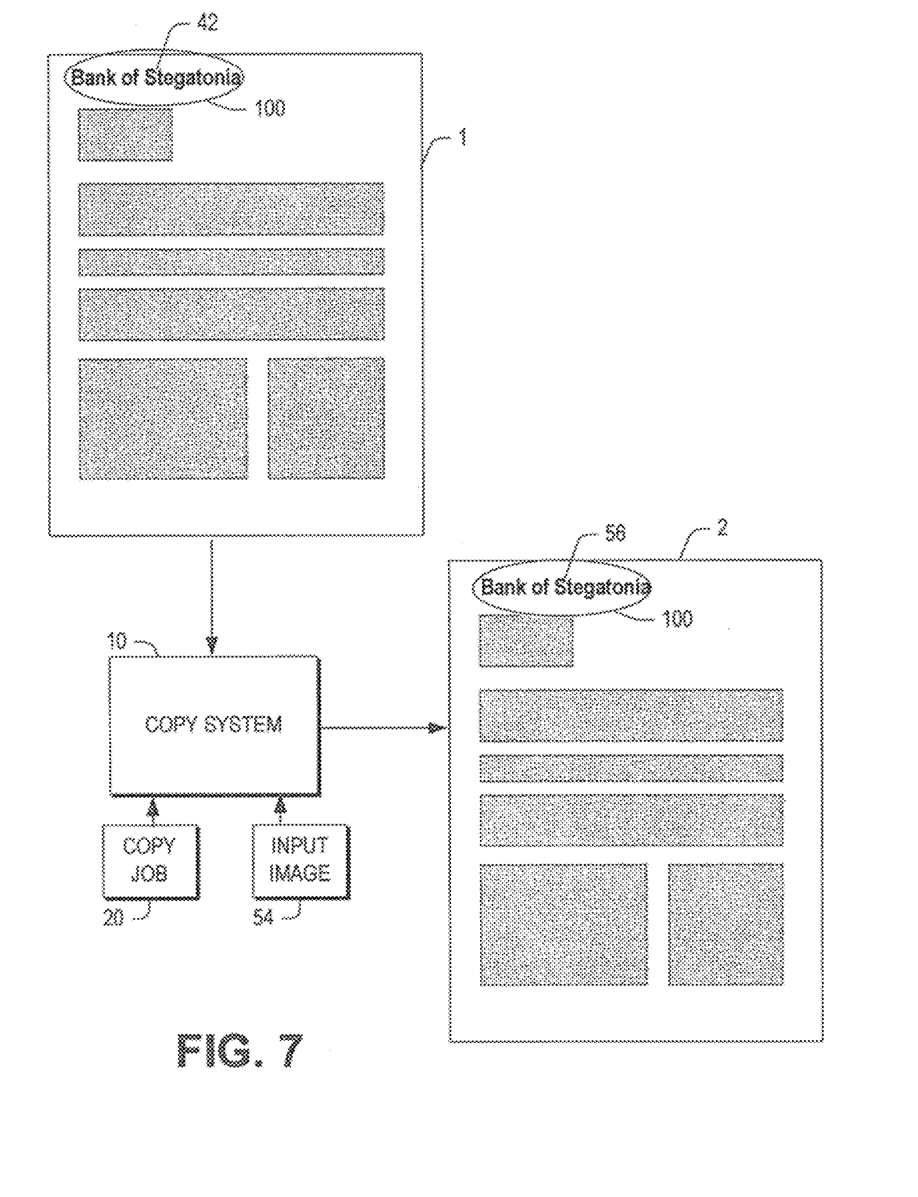
FIG. 7 is a block diagram illustrating another example of a secure document copying process.

FIG. 7 illustrates an example of a secure copying process when the original document 1 does contain the data-bearing halftone image logo as shown in FIG. 4. The original document 1 illustrated in FIG. 7 has a logo 42 in the logo location 100. Thus, referring back to FIG. 3, the data-bearing image 42 would be detected in block 44. If the resolution is sufficient, the original payload 46 could be recovered.

Referring again to FIG. 3, a logo detector can be employed in block 44 to determine the presence a stegatone logo in the image of the original document 1. If a stegatone logo is detected, the image of the stegatone 42 along with the logo mule input image 54 is delivered to the Stegatone Recovery System included in block 46, which recovers the data payload and translates it to user friendly data. A number of feature-based, or pixel-based techniques can be leveraged to locate the original stegatone image 42 quickly and efficiently. For example, a scale invariant feature transform (SIFT), and a number of derivative methods can be used to perform various image matching tasks, such as matching the detected image 42 with the input image 54. Another example approach contemplated is based on the Viola-Jones fast-object detection framework used in face recognition applications. The "features" computed by this method can be computed in near constant time. By combining a set of weak classifiers, each of which eliminates some percent of false positive samples, this method prunes the search space of all possible candidate regions while providing an absolute measurement of the likelihood that a candidate image contains the marking of interest.

Applying this technique to a document imaging problem yields certain advantages that result in even faster computation. Since the scale of the marking is known (approximately), the number of scales to search can be drastically reduced. Also, since the markings in a secure copy application are essentially physical renderings of bi-tonal images, there are several convenient methods by which the classical halftone can be mapped into a set of simple filters used to detect a corresponding stegatone. One example involves representing a marking with a quad-tree decomposition into boxes with varying gray average levels; the decomposition can be guided by decisions that result in high variance of gray level values. Other more complicated optimizations schemes can be used to approximate a marking with the smallest number of rectangles possible.

Figure 8:
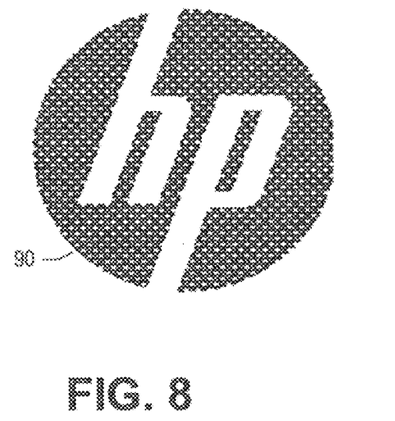
FIG. 8 is an example of a reference halftone image suitable for creating a correlation model.
Figure 9:
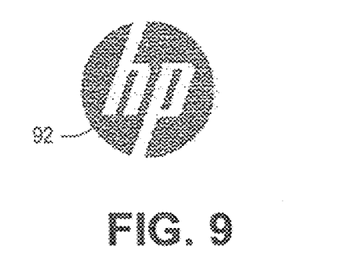
FIG. 9 is a scan of a print of a data-bearing version of the image illustrated in FIG. 8.

The logo detector 44 can be implemented with a fast correlation engine modeled after a Viola-Jones object detector. Some implementations include a mechanism that requires no (statistical) training to create a model. Rather, a model is generated directly from a classical halftone version of a data-bearing mark. In a web-connected system, the model could be computed online at decode time either on or off the copy device depending on its computation power. FIG. 8 illustrates an example halftone image 90 used to create such a model. FIG. 9 illustrates a stegatone version 92 of the image 110 extracted from a document image by the stegatone detector 44.

The recovered original payload 46 is combined with the copy log 22 to create the new payload 50, which is merged with the input, or mule image 54. The new payload 50 thus would include the copy log 22 for the current copy job, as well as the payload information 46 from the original document 1. The new payload 50 is merged with the input image 54 to create the new data-bearing image 56. Referring back to FIG. 7, the new logo 56 is merged with the document content image resulting in the copy 2 having the new logo 56 in the logo location 100.

Figure 10:
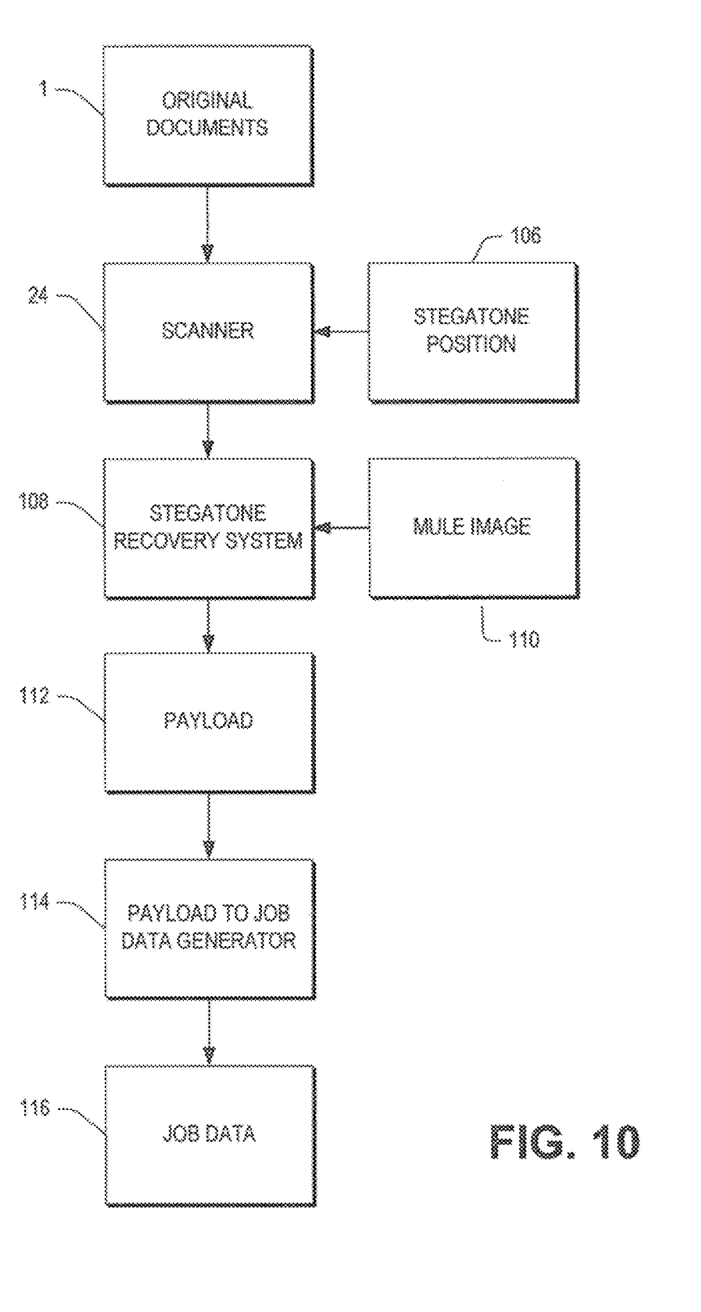
FIG. 10 is a block diagram of an example process for recovering encoded data from a stegatone.

FIG. 10 illustrates an example process for recovering encoded data from a stegatone such as disclosed in conjunction with the payload recovery 46 in FIG. 3. An original document 1 created, for example, using the techniques described above includes encoded data of the copy job that resulted in producing the original document 1. The secure documents 1 is scanned in block 24 to receive data indicating the position 106 of the stegatone, e.g., the coordinates of the stegatone on a page. The scanned data may be provided to a stegatone recovery system 108 that receives, as input, a mule image 110 to provide a basis for recovering the encoded image. The stegatone recovery system 108 may then produce a payload 112, which includes aspects of the data encoded in the original mule image of the secure documents 1. A payload to job data generator 114 may generate print job data from the payload 112. The print job data 116 may then be analyzed to determine the source of the secure documents 102, such as the identity of the user who copied the document, the time and date the copy was produced, the specific machine used to create the copy, and other information captured by the copy job.

Although specific examples have been illustrated and described herein, it will be appreciated by those of ordinary skill in the art that a variety of alternate and/or equivalent implementations may be substituted for the specific examples shown and described without departing from the scope of the present invention. This application is intended to cover any adaptations or variations of the specific examples discussed herein. Therefore, it is intended that this invention be limited only by the claims and the equivalents thereof.

What is claimed is:

1. A system, comprising
a scanner to create an image of document content of a document;
a processor in communication with the scanner, the processor being programmed to generate a log of a copy job for copying the document, encode the log using an input image to produce a data-bearing halftone image, and merge the data-bearing halftone image with the document content image; and
a printer in communication with the processor to print the merged data-bearing halftone image and the document content image to produce a copy of the document.

2. The system of claim 1, further comprising:
a memory accessible by the processor to store information associated with the copy job.

3. The system of claim 2, wherein the encoded log includes an index to the information associated with the copy job stored in the memory.

4. The system of claim 1, wherein the processor is configured to detect an original data-bearing halftone image in the document content.

5. The system of claim 1, wherein the document content image includes an original data-bearing halftone image, and wherein the processor is configured to delete the original data-bearing halftone image from the document content.

6. The system of claim 1, wherein the document content image includes an original data-bearing halftone image, and wherein the processor is configured to:
recover data from the original data-bearing halftone image; and
combine the data from the original data-bearing halftone image with the log.

7. The system of claim 1, wherein the processor is configured to de-skew the document content image.

8. A method, comprising:
   initiating a copy job for copying a document having document content;
   generating a log of the copy job;
   scanning the document to create a document content image;
   encoding the log using an input image to produce a data-bearing halftone image;
   merging the data-bearing halftone image with the document content image;
   printing the merged data-bearing halftone image and the document content image to produce a copy of the document.

9. The method of claim 8, wherein copy job log includes a name of a user who initiated the copy job, and a time and date when the copy of the document was produced.

10. The method of claim 8, wherein the input image comprises a logo.

11. The method of claim 8, wherein the document content image includes an original data-bearing halftone image, and wherein the method further comprises:
    recovering data from the original data-bearing halftone image; and
    combining the data from the original data-bearing halftone image with the log.

12. The method of claim 8, wherein the document content image includes an original data-bearing halftone image, and wherein the method further comprises:
    recovering data from the original data-bearing halftone image; and
    initiating security actions in response to the recovered data.

13. The method of claim 8, further comprising:
    de-skewing the document content image.

14. A non-transitory computer readable storage medium storing instructions for controlling a processor to perform a method, comprising:
    receiving an initiation of a copy job for copying a document having document content;
    generating a log of the copy job;
    scanning the document to create a document content image;
    encoding the log using an input image to produce a data-bearing halftone image;
    detecting an original data-bearing halftone image in the document content; and
    initiating security actions in response to detecting an original data-bearing halftone image in the document content.

15. The non-transitory computer readable storage medium storing of claim 14, wherein the method further comprises:
    deleting the original data-bearing halftone image;
    merging the data-bearing halftone image with the document content image; and
    printing the merged data-bearing halftone image and the document content image to produce a copy of the document.

* * * * *

UNITED STATES PATENT AND TRADEMARK OFFICE
CERTIFICATE OF CORRECTION

PATENT NO. : 9,454,721 B2
APPLICATION NO. : 14/414482
DATED : September 27, 2016
INVENTOR(S) : Robert Alan Ulichney et al.

Page 1 of 1

It is certified that error appears in the above-identified patent and that said Letters Patent is hereby corrected as shown below:

In the claims

In column 6, line 36, in Claim 1, delete "comprising" and insert -- comprising: --, therefor.

Signed and Sealed this
Twentieth Day of December, 2016

Michelle K. Lee
*Director of the United States Patent and Trademark Office*